United States Patent Office 3,657,389
Patented Apr. 18, 1972

3,657,389
HOT-MELT ADHESIVE POLYMER BLENDS
John R. Caldwell and Winston J. Jackson, Jr., Kingsport, Tenn., assignors to Eastman Kodak Company, Rochester, N.Y.
No Drawing. Continuation-in-part of application Ser. No. 671,940, Oct. 2, 1967. This application Feb. 12, 1970, Ser. No. 11,033
Int. Cl. C08g 39/10
U.S. Cl. 260—873                                              5 Claims

ABSTRACT OF THE DISCLOSURE

Improved hot-melt adhesives comprising polyesters blended with polyolefins or vinyl polymers and articles secured therewith. The polyesters of 1,4-butanediol and terephthalic or trans-1,4-cyclohexane dicarboxylic acid, blended with polystyrene are preferred adhesive compositions.

---

This application is a continuation-in-part of copending application S.N. 671,940, titled Hot-melt Adhesive Polymer Blends, by Caldwell and Jackson filed Oct. 2, 1967, now abandoned.

This invention relates to hot-melt adhesives. In particular, it relates to hot-melt adhesives which consist of blends of polyesters with polyolefins or with vinyl polymers.

Compared to other types of adhesives, hot-melt adhesives are of importance because of their speed of application. No solvents must evaporate and no curing must take place, and strong adhesive bonds are obtained as soon as the adhesive cools. Polyesters have been found useful in hot-melt adhesives, however, many such polyesters have low adhesive strength, particularly peel strength, on various substrates, such as aluminum, copper, steel, glass, etc., and on substrates coated with various materials, such as polyepoxide resins, vinyls, phenolics, alkyds, acrylics, etc. Moreover, many polyesters, particularly crystalline high-melting polyesters, have inferior flowing wetting properties and, therefore, must be applied at relatively high temperature when used as hot-melt adhesives.

Objects of this invention, therefore, are to provide polyester compositions with improved adhesion to various types of substrates, to provide polyester compositions with improved processability as hot-melt adhesives, to provide laminated compositions consisting of various substrates bonded with these compositions, and to provide polyester compositions used to coat a substrate.

These and other objects hereinafter appearing have been attained in accordance with the present invention through the discovery that certain blends of polyesters with polyolefins or with vinyl polymers unexpectedly give greatly improved adhesion and processability. The polyester component may comprise from about 50 to about 99% of the blend, and preferably from about 70 to 95%.

Blends of polyesters with certain vinyl polymers are described in U.S. 3,290,411, Br. 1,052,863, and Br. 1,066,-061. These patents describe methods of making blends, principally with styrene polymers, and conversion of the blends into fibers. The recognition of the melt-adhesive characteristics and resulting laminates are, however, entirely lacking in these disclosures.

The polyesters of this invention are prepared by conventional techniques, preferably by ester interchange of glycols and dialkyl esters of dicarboxylic acids. More than one glycol or acid may be used to give copolymers. The glycol may be aliphatic or alicyclic, it may contain from 2 to 20 carbon atoms, and the carbon chain may be straight or branched. Examples of such glycols are ethylene glycol, 1,2-propylene glycol, 1,4-butanediol, 1,6-hexanediol, 1,10-decanediol, 1,3-pentanediol, 2,2-dimethyl-1,3-propanediol, 1,4-cyclohexanediol, 1,3-cyclohexanedimethanol, 1,4-cyclohexanedimethanol, diethylene glycol, and triethylene glycol. Preparation of the polyester using mixtures of glycols are fully within the scope of this invention. In one embodiment, based on the total moles of glycol, at least 80 mole percent of the above noted glycols, or mixtures thereof, can be used.

The dicarboxylic acid may be aliphatic, alicyclic, or aromatic and may contain from 2 to 20 carbon atoms. The carbon chain of the aliphatic acids may be straight or branched. Examples of such acids are malonic, dimethylmalonic, adipic, 2-methyladipic, azelaic, sebacic, terephthalic, isophthalic, hexahydroterephthalic, hexahydroisophthalic, trans - 1,4 - cyclohexanedicarboxylic, 2,5-norbornanedicarboxylic, and oxydipropionic. In this invention mixtures of acids can be used. In one embodiment, based on the total moles of dicarboxylic acid, at least 80 mole percent of the above noted acids, or mixtures thereof, can be used.

Crystalline polyesters are preferred to amorphous polyesters because, in general, the crystalline polyesters have higher melting points and, therefore, are useful at higher temperatures. This invention is also applicable to amorphous polyesters, and the blending of a polyolefin or a vinyl polymer with either crystalline or amorphous polyesters yields hot-melt adhesive with improved flowing and wetting properties and improved processing characteristics. Surprisingly, the blends, particularly those of the crystalline polyesters, have better adhesion to various substrates than the unblended polyesters. Also, surprisingly, the polyesters retain their high-temperature adhesive properties, and some blends even have high-temperature adhesive properties superior to those of the unblended polyesters (see Table 5). It would be thought that blending a brittle, low-melting polymer, such as polystyrene, with a high-melting polyester would give a product with poorer adhesive properties, particularly at elevated temperatures. The reason for this unusual effect is unknown. It was observed, however, that for the most part, the polyolefins and vinyl polymers are incompatible with the polyesters.

More than two polymers may be blended together, e.g., two polyesters and one polyolefin, one polyester and two polyolefins, etc., and a wide variety of polyolefins may be used in the compositions of the invention. The hard, rigid types such as polystyrene are useful for the production of melt adhesives that are required to retain their bond strength at relatively high temperatures. Softer types such as polyethylene and polyisobutylene are useful for improving the flow properties of the blend and also for improving the low temperature adhesive properties. Typical examples of suitable polyolefins include polystyrene, and substituted styrene polymers such as poly(alphamethylstyrene), poly(p - chlorostyrene), polyethylene, polypropylene, polybutene-1, poly(vinylcyclohexane), poly(4-methylpentene), and poly(allylbenzene). Polystyrene and copolymers of styrene containing up to about 50 weight percent styrene are particularly useful in this invention. The polymers may be of the amorphous type or they may be stereoregular types. Other olefin-type polymers which may be used are listed in U.S. 3,239,582, column 2, lines 10–47. Mixtures of polyolefins can be used in this invention.

Copolymers of olefins are also useful as represented by styrene-ethylene, styrene-butylene, propylene-ethylene, butylene-ethylene, etc. Copolymers of olefins with other types of monomers are useful, as represented by ethylene-vinyl acetate, ethylene-methyl acrylate, ethylene-acrylic acid, styrene-acrylic acid, styrene-methyl methacrylate, etc.

In general, any type of vinyl polymer and copolymer is useful in practicing the invention, providing it is stable under the conditions used to form the adhesive bond. These polymers are derived from polymerizable compounds containing a —CH=C< group or more especially a $CH_2$=C< group. Suitable unsaturated compounds of this latter kind include vinyl propionate, vinyl butyrate, vinyl trifluoroacetate, vinyl benzoate, etc., alkyl esters of acrylic and methacrylic acids such as methyl acrylate, ethyl acrylate, butyl acrylate, methyl methacrylate, etc., unsaturated nitriles such as acrylonitrile, methacrylonitrile, ethacrylonitrile, vinylidene cyanide, etc., vinyl hydrocarbons and derivatives such as styrene, alpha-methylstyrene, p-methylstyrene, p-acetaminostyrene, alphaacetoxystyrene, ethylene, isobutylene, etc., halogen unsaturates such as vinyl chloride, vinyl fluoride, vinylidene chloride, vinylidene fluoride, tetrafluoroethylene, chlorotrifluoroethylene, etc., the amides, N-alkylamides and N,N-dialkylamides of acrylic and methacrylic acids, such as acrylamide, N-methyl acrylamide, N-isopropyl acrylamide, N,N-dimethylacrylamide, methacrylamide, N-butyl methacrylamide, etc., vinyl imides, N-vinyl lactams, vinyl pyrrolidones, vinyl pyridines, the esters, amides and ester-amides of maleic, fumaric, itaconic and citraconic acids, vinyl alkyl ketones, vinyl alkyl ethers, and the like. Polymers and copolymers made from the lower alkyl and cycloalkyl acrylates and methacrylates are of particular value. Polymers made from phenyl and substituted phenyl esters of methacrylic acid are useful because of their high glass-transition temperatures.

Blending of the polyesters with the polyolefins or vinyl polymers may be carried out by various common procedures, including mechanical mixing of the particles, blending on hot rolls, mixing in the melt, or mixing in solution and then removing the solvent. The latter method is preferred for polyesters and vinyl polymers which can be dissolved in a common solvent, such as chloroform. Films are cast and used for forming the adhesive bonds. Blending in solution is also preferred for polyesters which melt above 250° C. It is usually necessary to heat the mixture to attain solution, and chlorinated biphenyls containing from 30 to 60% chlorine are suitable for use as solvents. After solution is attained, the solvent is removed by distillation under reduced pressure, and the last traces are removed by extraction. Polyesters melting below 250° C. may be melt blended by various techniques. A satisfactory procedure is to stir the two polymers together under an inert atmosphere in a flask immersed in a metal bath.

Substances which may be laminated by the adhesives of this invention include paper, cardboard, metals (such as steel, iron, aluminum, chromium, copper, brass, bronze, nickel, zinc, titanium, and tin), wood, glass, ceramic materials, and fabrics. The fabrics may be natural or synthetic fibers or blends of fibers, including cotton, wool, silk, polyesters, polyamides, cellulose esters, regenerated cellulose, and acrylics. Substrates coated with a synthetic resin such as polyepoxide resin, epoxy-phenolic resin, melamine resin, phenolic resin, alkyd resin, a vinyl, or an acrylic coating also may be laminated with the blends of this invention which contain a 1,4-butanediol polyester or copolyester of at least one acid selected from the group consisting of trans-1,4-cyclohexanedicarboxylic acid, hexahydroterephthalic acid, and hexahydroisophthalic acid. The same or different materials may be laminated in one structure. It is generally advisable to clean the surfaces of the components to be laminated just prior to formation of the melt adhesive bonds to remove foreign matter, grease, oxide coatings, etc., which might interfere with the formation of strong bonds.

The polyester adhesive may be applied in molten form with a spatula or regular extrusion equipment to the surfaces of the components to be laminated. If the polyester is soluble in a volatile solvent, such as chloroform, it may be applied as a dope and the solvent allowed to evaporate. Or a film of the polyester (2 to 6 mils in thickness) may be placed between the surfaces. After application of the polyester, the surfaces are clamped together with a pressure of several pounds per square inch and heat is applied by placing the clamped structure in a forced-air oven, in a hot oil bath, or in a metal bath at a temperature about 20 to 50° C. above the softening range of the polyester. A convenient way of bonding metal test strips for peel tests is to heat them together on a hot plate while rubbing back and forth with a wooden spatula. No additional pressure is necessary. A glue line (adhesive thickness) of 3 to 5 mils is satisfactory.

Since many fabric cannot withstand the heat required for making melt adhesive bonds, fabrics preferably are bonded by applying the adhesive dissolved in a volatile solvent, such as chloroform. The solvent is removed by heating the clamped structure in an oven.

Fillers, pigments, and glass cloth may be incorporated in the adhesive layer to increase the bonding strength and temptrature resistance. Fillers and pigments, such as very finely divided silica, alumina, or calcium carbonate, also affect the degree of crystallinity and the size of the crystallites. From 1 to 30% by weight may be added. Antioxidants and stabilizers also may be incorporated in the polymers to improve the thermal and oxidative stability at elevated temperatures.

The following examples will further illustrate the invention. In the examples, all polyesters are prepared by conventional procedures from glycols and dialkyl esters of dicarboxylic acids. Inherent viscosities (I.V.) are determined at a concentration of 0.25 g./100 ml. in 60/40 phenol/tetrachloroethane at 25° C. Abbreviations of acid derivatives used in preparing the polyesters are listed in Table 1.

TABLE 1

Adipic _____ A
Trans-1,4-cyclohexanedicarboxylic _____ C
Hexahydroterephthalic _____ HT
2,6-naphthalenedicarboxylic _____ N
Sebacic _____ S
Terephthalic _____ T Abbreviations of glycols used in preparing the polyesters are listed in Table 2.

TABLE 2

Ethylene glycol _____ EG
1,4-butanediol _____ B4
Neopentyl glycol _____ NPG
1,4-cyclohexanedimethanol _____ CHDM
2,2,4,4-tetramethyl-1,3-cyclobutanediol _____ TMCD All percentages in the later tables refer to mole percent, and all temperatures are degrees centigrade.

Blend preparation

Unless indicated otherwise, all blends are made in the melt. To remove all traces of moisture, the particles of polyester and polymeric additive are slowly stirred together in a flask under reduced pressure (ca. 1 mm.) immersed in a metal bath at 120–130° C. for 1 hr. The vacuum is then released to nitrogen. The polymers with melting points below 250° C. are heated to 230–270° C., depending upon the polyester melting point, with stirring in the nitrogen atmosphere for about 30 min. to make the melt blends.

If the polyester melts above 250° C., e.g., poly(ethylene terephthalate) and poly(1,4-cyclohexylenedimethylene terephthalate), the polyester, the polymeric additive, and a chlorinated biphenyl (chlorine content about 42%) are stirred together under a nitrogen atmosphere while the metal bath temperature is raised from 150° C. to 260° C. The weight of solvent is twice that of the polymers. When the polymers are completely dissolved, reduced pressure is applied to remove the solvent. The last traces of solvent are removed by placing the polymer, ground to pass a 3 mm. screen, in a Soxhlet extractor and extracting with hexane.

Polymers which are soluble in chloroform also may be blended by dissolving in this solvent and casting films. To avoid decomposition during formation of the melt adhesive bonds, the last traces of solvent are removed by first drying the films in an oven. The tables indicate the blends which are prepared by film casting.

Specimen preparation and testing

The T-peel strengths of laminates with metallic specimens are measured in accordance with ASTM D1876–61T but using precut specimens. The specimens, 1 in. wide, are degreased by washing three times with a detergent solution of Alconox (Alconox, Inc.) and rinsing in water each time. The specimens are then rinsed with acetone and allowed to dry in the air. A specimen is then heated sufficiently on a hot plate for the polyester to melt (applied as 20-mesh particles or by rubbing a large piece back and forth). A hot plate temperature of 240–260° C. is satisfactory for most of the blends, but blends of the higher-melting polymers require 280° C. After the molten polymer is evenly spread on the specimen over a 2 in. length with a wooden spatula, the top piece of metal is pressed against the sample. The sample is then turned over on the hot plate with the second metal strip against the hot plate surface. Heating is continued while the wooden spatula is rubbed back and forth over the adhesive area until a smooth, even glue line is obtained (about 30 sec.). Then the specimen is placed on the laboratory bench and rubbing continued for about 20 sec. longer while the adhesive cools. This method of forming the adhesive bonds gives reproducible results similar to those obtained by clamping the specimens together and heating in a forced-air oven 20 to 50° C. above the polymer melting point. Glue lines are about 3 to 5 mils in thickness.

Laminates with paper and cardboard are prepared by melting the adhesive on a metal spatula placed on a hot plate, applying the molten adhesive to one piece of paper or cardboard, and then heat-sealing to the second substrate with conventional heat-sealing equipment.

The T-peel strengths of the laminates listed in Tables 3-5 are determined with 0.012-in. thick aluminum, type 1100, and with 0.007-inch. steel coated with an epoxy-phenolic resin of bisphenol A. The tensile shear strengths of the laminates listed in Table 5 are measured by modification of ASTM D1002–64. The modification consists of the use of precut 0.064-in. thick cold rolled steel specimens, ASTM A–415, polished on one side. These specimens are cleaned as described above, and the adhesive bonds are formed in the same manner.

The tensile shear strengths and T-peel strengths are determined on an Instron tensile tester. A forced-air oven is fitted around the tester for the determinations at 70° C. and 120° C.

Table 3 lists the T-peel strengths which are obtained with the aluminum and the epoxy-phenolic coated steel laminated with various blends of C/B4 polyester (from trans - 1,4 - cyclohexanedicarboxylic acid and 1,4 - butane-diol). Since many of the examples in this and later tables include blends with conventional polystyrene having, e.g., an I.V. of 0.58 in chloroform, the results obtained with the polystyrene alone are given in Example 1; Example 2 lists the results obtained with the polyester alone. In these and subsequent examples the presence of the polyolefin or vinyl polymer in the blend improves the processability of the adhesive and improves the ease with which it can be spread over the heated substrate to form the adhesive bonds.

Table 4 lists the T-peel strengths which are obtained with the 12-mil aluminum laminated with blends of polystyrene and various polyesters. (When thinner aluminum, e.g., 8-mil is used, lower values are often obtained.) Example 1 in Table 3 gives the results obtained with the polystyrene alone on the 12-mil aluminum used in all these examples.

The blends of the butanediol polyesters in Tables 3 and 4 have good tensile shear strength on steel and aluminum coated with polyepoxide, epoxy-phenolic, melamine, and phenolic resins. These blends also have good tensile shear strength on such fabrics as poly(ethylene terephthalate), poly(1,4-cyclohexylenedimethylene terephthalate), cotton, and nylon 66, and the like, (adhesive applied to fabric from chloroform dope and dried at room temperature). The polymer blends in Tables 3 and 4 also show good tensile shear strength on paper, cardboard, glass, wood, porcelain, iron, steel, copper, brass, nickel, titanium, and chromium.

Table 5 shows the effect of heat on the T-peel strength and tensile shear strength of two of the polyesters and their polystyrene blends. Note that polystyrene not only does not depress the heat resistance of the polyester adhesives but, surprisingly, even improves it, particularly with the higher-melting T/B4 polyester (M.P. 225° C.). The melting point of the C/B4 polyester is 167° C.

TABLE 3.—POLYMER BLENDED WITH C/B4 POLYESTER [a]

| | | | T-peel strength at 23° C., lb./in. | |
|---|---|---|---|---|
| Example | Type | Wt. percent | Aluminum | Coated steel |
| 1 | Polystyrene alone (control) | 100 | 0.7 | 0.4 |
| 2 | Polyester alone (control) | 0 | 4 | 33 |
| 3 | Polystyrene | 5 | 9 | 42 |
| 4 | do | 10 | 7 | 60 |
| 5 | do | 15 | 14 | 33 |
| 6 | do | 20 | 29 | 31 |
| 7 | do | 30 | 20 | |
| 8 | do | 50 | 13 | |
| 9 | Poly (80/20 styrene/p-chlorostyrene) | 20 | 17 | |
| 10 | Poly (70/30 styrene/alpha-methylstyrene) | 25 | 21 | |
| 11 | Poly (p-methylstyrene) | 40 | 15 | |
| 12 | Poly (80/20 styrene/acrylic acid) | 15 | 10 | |
| 13 | Poly (70/30 styrene/butadiene) | 15 | 12 | |
| 14 | Poly (70/30 styrene/acrylonitrile) | 15 | 10 | |
| 15 | Polyethylene | 15 | 9 | |
| 16 | Polypropylene | 15 | 10 | 37 |
| 17 | Poly (1-butene) | 15 | 9 | |
| 18 | Poly (60/40 propylene/1-butene) | 15 | 10 | |
| 19 | Poly (ethyl acrylate) [b] | 15 | 15 | |
| 20 | Poly (methyl methacrylate) [b] | 15 | | 44 |
| 21 | Poly (85/15 ethylacrylate/acrylic acid) [b] | 15 | | 38 |
| 22 | Polystyrene [b] | 15 | 27 | 55 |

[a] From trans-1, 4-cyclohexanedicarboxylic acid and 1, 4-butane-diol; I.V. 1.13.
[b] Polyester inherent viscosity was 1.31 instead of 1.13, and blends were made by dissolving the polymers in chloroform and casting films.

TABLE 4

| Example | Polyester Acid derivative [a] | Glycol [b] | I.V. | Polystyrene amount, wt. percent | T-peel strength at 23° C. on Al, lb./in. |
|---|---|---|---|---|---|
| 23 | 50/50 C/T | B4 | 1.48 | 0 | 13 |
| 24 | 50/50 C/T | B4 | 1.48 | 15 | 30 |
| 25 | T | B4 | 0.96 | 0 | 9 |
| 26 | T | B4 | 1.31 | 0 | 10 |
| 27 | T | B4 | 1.31 | 15 | 25 |
| 28 | T | B4 | 1.31 | 25 | 13 |
| 29 | T | B4 | 1.31 | 35 | 16 |
| 30 | N | B4 | 1.08 | 0 | 21 |
| 31 | N | B4 | 1.08 | 15 | 25 |
| 32 | 60/40 T/HT | B4 | 1.06 | 0 | 16 |
| 33 | 60/40 T/HT | B4 | 1.06 | 15 | 26 |
| 34 | T | EG | 0.97 | 0 | 23 |
| 35 | T | EG | 0.97 | [c] 20 | 26 |
| 36 | 67/33 T/A | EG | 0.49 | 0 | 16 |
| 37 | 67/33 T/A | EG | 0.49 | 15 | 45 |
| 38 | T | CHDM | 0.94 | 0 | 7 |
| 39 | T | CHDM | 0.94 | [c] 15 | 9 |
| 40 | 60/40 T/S | CHDM | 0.96 | 0 | 28 |
| 41 | 60/40 T/S | CHDM | 0.96 | 15 | 32 |

[a] See Table 1 for abbreviations.
[b] See Table 2 for abbreviations.
[c] Blended in a chlorinated biphenyl containing 42% chlorine.

TABLE 5

| Example | Polyester Acid derivative [a] | Glycol [b] | I.V. | Blended polymer Type | Wt. percent | T-peel strength on aluminum, lb./in. | | | Tensile shear strength on steel, p.s.i. | | |
|---|---|---|---|---|---|---|---|---|---|---|---|
| | | | | | | 23° | 70° | 120° | 23° | 70° | 120° |
| 42 | C | B4 | 1.13 | | 0 | 4 | | | 800 | 400 | 300 |
| 43 | C | B4 | 1.13 | Polystyrene | 15 | 14 | 26 | 9 | 1,400 | 500 | 300 |
| 44 | C | B4 | 1.39 | do | 15 | 25 | | | | 1,300 | 500 |
| 45 | T | B4 | 1.31 | | 0 | 10 | | | 500 | | 200 |
| 46 | T | B4 | 1.31 | Polystyrene | 15 | 25 | 29 | 19 | 2,200 | 1,500 | 900 |

[a] C is trans-1,4-cyclohexanedicarboxylic acid. T is terephthalic acid.
[b] B4 is 1,4-butanediol.

Example 47

Blends are prepared by casting films from chloroform of C/B4 polyester (I.V. 1.13) and 67/33 T/A polyester (I.V. 0.49) containing the listed amounts of each of the following vinyl polymers. The blends show good tensile shear strength on paper, aluminum, steel, bronze, and tin. The presence of the vinyl polymer improves the ease with which the adhesive can be spread over the hot substrates.

(a) 20% Poly(70/30 styrene/butyl acrylate)
(b) 10% Poly(80/20 styrene/dimethyl fumarate)
(c) 15% Poly(phenyl methacrylate)
(d) 15% Poly(cyclohexyl acrylate)
(e) 18% Poly(50/50 isobutyl methacrylate/N,N-dibutylmethacrylamide)
(f) 10% Poly(50/50 vinylidene chloride/vinyl chloride)
(g) 8% Poly(80/20 vinyl acetate/vinyl chloride)
(h) 15% Poly(50/50 isopropenyl acetate/diethyl fumarate)
(i) 15% Poly(vinyl pyrrolidone)

Example 48

Melt blends are prepared from T/B4 polyester (I.V. 1.16) and the listed amounts of each of the following polyolefins. The blends show good tensile shear strength on paper, aluminum, steel, and copper. The presence of the rubbery polyolefins improves the ease with which the adhesive can be spread over the hot substrates.

(a) 15% Isotactic polystyrene
(b) 15% Isotactic poly(4-methylpentene)
(c) 20% Polyisobutylene
(d) 15% Polychloroprene Example 49

Melt blends are prepared consisting of 15% polystyrene and 85% of each of the following polyesters. The blends show good tensile shear strength on paper, aluminum, and steel. The presence of the polystyrene improves the ease with which the adhesive can be spread over the hot substrates. The polyesters are prepared from the glycols and dialkyl esters of the following acids:

(a) Terephthalic acid and 75/25 1,4-cyclohexanedimethanol/neopentyl glycol
(b) 4,4'-sulfonyldibenzoic acid and 1,5-pentanediol
(c) 4,4'-methylenedibenzoic acid and 1,10-decanediol
(d) Carbonic acid and 2,2,4,4-tetramethyl-1,3-cyclobutanediol
(e) Terephthalic acid and 50/50 2,2,4,4-tetramethyl-1,3-cyclobutanediol/1,4-cyclohexanedimethanol
(f) 60/40 4,4'-diphenic acid/adipic acid and 1,4-butanediol The invention has been described in detail with particular reference to preferred embodiments thereof, but it will be understood that variations and modifications can be effected within the spirit and scope of the invention.

We claim:
1. An adhesive composition comprising:
   (A) about 50 to about 99% by weight of a polyester of 1,4-butanediol and trans-1,4-cyclohexanedicarboxylic acid or an ester forming derivative theerof, and
   (B) about 1 to about 50% by weight of polystyrene.
2. The composition of claim 1 wherein the polyester comprises from about 70 to about 95% by weight of the composition.
3. An adhesive composition comprising, based on the weight of the total composition
   (A) about 50–99 weight percent of a polyester of at least 80 mole percent 1,4-butanediol and at least 80 mole percent trans-1,4-cyclohexanedicarboxylic acid, or an ester forming derivative thereof, and
   (B) about 1 to about 50 weight percent of at least one polymer selected from the group consisting of
      (1) polystyrene,
      (2) copolymers of about 50–99 weight percent styrene and about 1 to 50 weight percent of at least one other copolymerizable olefinic monomer,
      (3) polyethylene,
      (4) polypropylene,
      (5) polybutene-1,
      (6) poly(4-methylpentene),
      (7) poly(allylbenzene),
      (8) propylene-ethylene copolymer,
      (9) butylene-ethylene copolymer,
      (10) ethylene-vinyl acetate copolymer,
      (11) ethylene-methyl acrylate copolymer,
      (12) ethylene acrylic acid copolymer,
      (13) poly(propylene-1-butene),
      (14) poly(ethyl acrylate),
      (15) poly(ethyl acrylate-acrylic acid), and mixtures thereof.
4. The composition of claim 3 wherein the polymer (B) comprises polystyrene.
5. The composition of claim 4 wherein the polymer (B) is a copolymer selected from
   (1) poly(styrene-p-chlorostyrene),
   (2) poly(styrene-alpha-methylstyrene),
   (3) poly(styrene-acrylic acid),

(4) poly(styrene-butadiene),
(5) poly(styrene-acrylonitrile),
(6) poly(styrene-ethylene),
(7) poly(styrene-butylene),
(8) poly(styrene-methylmethacrylate), or a combination of these.

References Cited

UNITED STATES PATENTS

| | | | |
|---|---|---|---|
| 3,484,339 | 12/1969 | Caldwell | 161—231 |
| 3,290,411 | 12/1966 | Tsvji et al. | 260—873 |
| 3,515,628 | 6/1970 | Jackson et al. | 161—231 |
| 3,532,533 | 10/1970 | Ackerman | 117—122 H |

FOREIGN PATENTS

| | | | |
|---|---|---|---|
| 132,546 | 5/1949 | Australia | 260—860 |

OTHER REFERENCES

Bryan et al., Defensive Publication of Serial No. 816,072, filed Apr. 14, 1969, published in 870 O. G. 17 on Jan. 6, 1970, Defensive Publication No. T870,004.

WILLIAM H. SHORT, Primary Examiner

E. WOODBERRY, Assistant Examiner

U.S. Cl. X.R.

117—122 H; 161—231